United States Patent
Winfield

(10) Patent No.: US 6,962,095 B2
(45) Date of Patent: Nov. 8, 2005

(54) ARRANGEMENT FOR PERMITTING VEHICLE FOOT PEDAL RETRACTION, AND VEHICLE INCORPORATING SAME

(75) Inventor: Alan Winfield, Scunthorpe (GB)

(73) Assignee: KSR Automotive Limited, (GB)

( * ) Notice: Subject to any disclaimer, the term of this patent is extended or adjusted under 35 U.S.C. 154(b) by 272 days.

(21) Appl. No.: 10/387,254

(22) Filed: Mar. 12, 2003

(65) Prior Publication Data

US 2003/0172770 A1   Sep. 18, 2003

(30) Foreign Application Priority Data

Mar. 13, 2002 (GB) .................................. 0205838

(51) Int. Cl.⁷ .............................................. G05G 1/14
(52) U.S. Cl. ........................................ 74/560; 74/512
(58) Field of Search ................................ 74/512, 560

(56) References Cited

U.S. PATENT DOCUMENTS 5,214,979 A * 6/1993 Crack ........................... 74/512
6,364,046 B1 * 4/2002 Forssell et al. ............... 74/512

FOREIGN PATENT DOCUMENTS

| EP | 0847900 | 6/1998 |
| EP | 1134128 | 9/2001 |
| WO | WO 9728029 | 8/1997 |

OTHER PUBLICATIONS

European Search Report dated Jun. 10, 2003.

* cited by examiner

Primary Examiner—David A. Pucci
Assistant Examiner—Bradley J. Van Pelt
(74) Attorney, Agent, or Firm—Trexler, Bushnell, Giangiorgi, Blackstone & Marr, Ltd.

(57) ABSTRACT

An arrangement for permitting retraction of a vehicle foot pedal, operable on a conventional push rod (14) of a brake booster or a clutch, in a frontal crash of sufficient magnitude, comprises a rotary member (1) attached to, and mounted on a blade (13) of the foot pedal for free rotation about the pivot, and adapted to be coupled to the push rod (12). The rotary member (1) has a decoupling feature (3-8) that is not activated during normal operation of the foot pedal, and displacement means (10, 11) is provided to cause partial rotation of the rotary member (1) upon a frontal impact of sufficient magnitude, to stress the decoupling feature (3-8) until a threshold value is reached whereupon the decoupling feature (3-8) is activated, thereby disconnecting the push rod (14) from rotary member (1) and hence from the blade (13) of a foot pedal, to permit free pedal movement.

4 Claims, 2 Drawing Sheets

ARRANGEMENT FOR PERMITTING VEHICLE FOOT PEDAL RETRACTION, AND VEHICLE INCORPORATING SAME

RELATED/PRIORITY APPLICATION

This application claims priority with respect to British Application No. 0205838.6, filed Mar. 13, 2002.

FIELD OF THE INVENTION

This invention relates in a first aspect to an arrangement for permitting retraction of the foot pedal of a vehicle away from the driver in a crash situation, and whilst the device would normally be effective on the brake pedal, the principles described could be applied to any other pedals (clutch pedal and the accelerator pedal), and in a second aspect to a vehicle incorporating such device.

BACKGROUND OF THE INVENTION

In EP 1134128 is described an arrangement in which, in a frontal crash situation of sufficient magnitude, the push rod is snapped upon crash induced rotation of a rotary member pivotally attached to the blade of the pedal, to cause decoupling of the push rod from the rotary member and hence freeing of the pedal.

OBJECT OF THE INVENTION

A basic object of the invention is the provision of an improved arrangement for producing crash induced decoupling of the push rod from the pedal, permitting vehicle foot pedal retraction, and a vehicle incorporating same.

SUMMARY OF A FIRST ASPECT OF THE INVENTION

According to a first aspect of the present invention there is provided an arrangement for permitting retraction of a vehicle foot pedal, operable on a conventional push rod of a brake booster or a clutch, in a frontal crash of sufficient magnitude, wherein a rotary member is attached to, and mounted on a blade of the foot pedal for free rotation about the pivot, and adapted to be coupled to the push rod, characterised in that:
(i) the rotary member (1) has a decoupling feature (3-8) that is not activated during normal operation, and
(ii) displacement means (10, 11) is provided to cause partial rotation of the rotary member (1) upon a frontal impact of sufficient magnitude, to stress the decoupling feature (3-8) until a threshold value is reached whereupon the decoupling feature (3-8) is activated, thereby disconnecting the push rod (14) from rotary member (1) and hence from the blade (13) of a foot pedal, to permit free pedal movement.

SUMMARY OF A SECOND ASPECT OF THE INVENTION

According to a second aspect of the invention, there is provided a motor vehicle comprising an arrangement in accordance with the first aspect.

ADVANTAGE(S) OF THE INVENTION

As the rotary member is adapted to change state from a push rod coupling mode in normal operation, to a push rod decoupling mode in a crash situation, the push rod may be of an industry standard construction.

PREFERRED OR OPTIONAL FEATURES

The rotary member (1) is metallic eg of mild steel, and the decoupling feature (3-8) is provided by the rotary member (1) incorporating an insert, (7) of synthetic plastics material, with the insert (7) defining, in part, a bore (8) to receive a portion of the push rod (12), whereby rotation of the rotary member (1) in a crash situation with a torque exceeding a threshold value results in the push rod (12) forcing the insert (7) from the rotary member (1), thereby decoupling the push rod (12) and the pedal blade.

The rotary member is wholly metallic and the decoupling feature (3, 4, 8) is provided by a zone of weakness.

BRIEF DESCRIPTION OF THE DRAWINGS

The invention will now be described in greater detail. by way of example only, with reference to the accompanying drawings, in which.

DETAILED DESCRIPTION OF THE DRAWINGS

Figure 2:
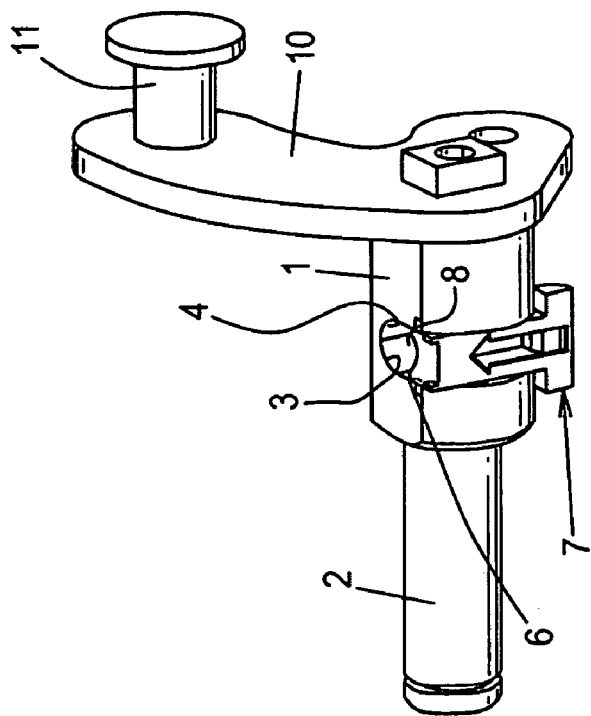
FIG. 2 is a perspective view from the other side and above.
Figure 1:
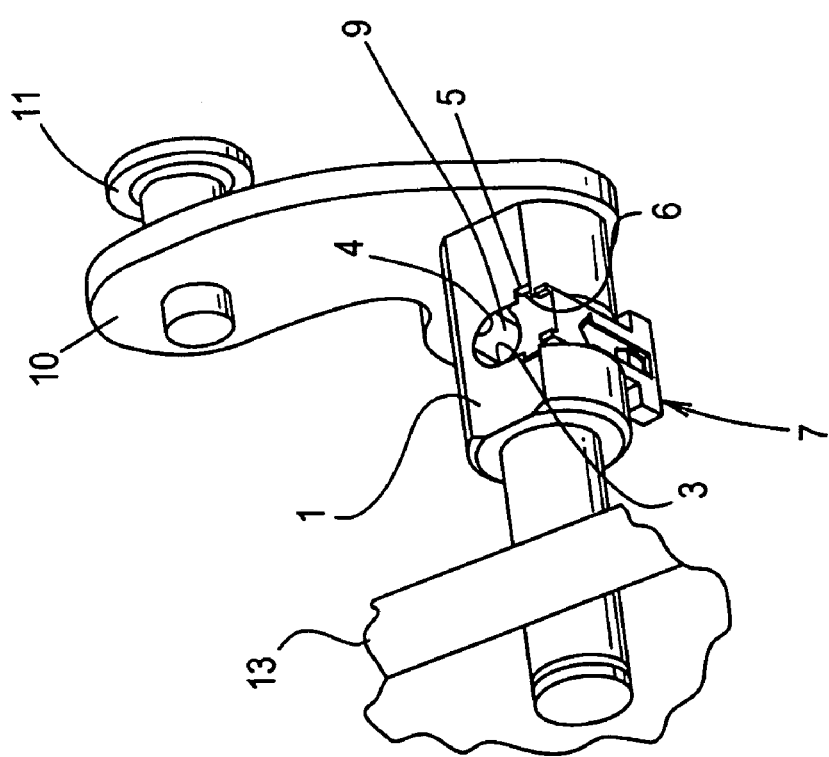
FIG. 1 is a perspective view from one side and above of an arrangement for permitting retraction of a vehicle foot pedal.
Figure 4:
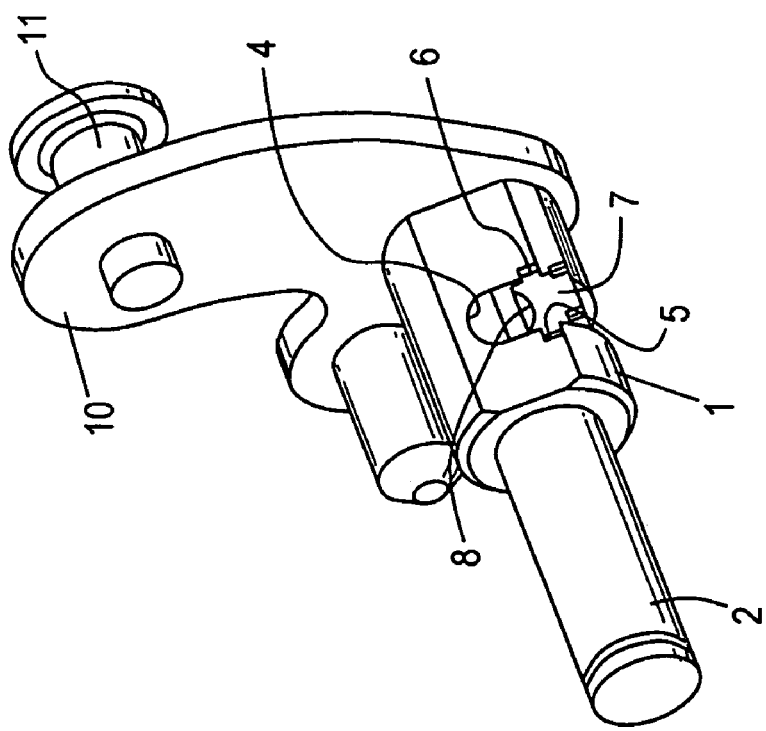
FIG. 4 is a perspective view from the other side and below.
Figure 3:
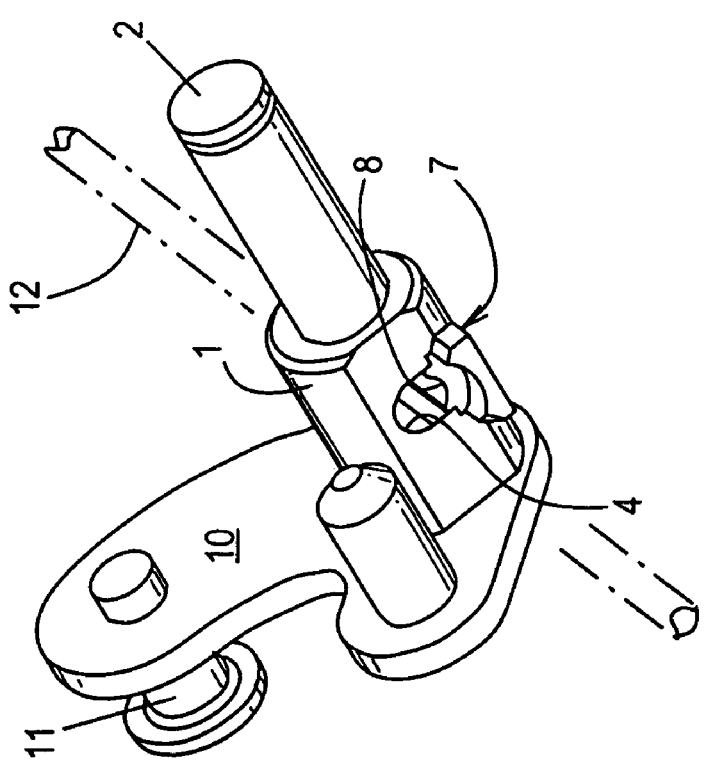
FIG. 3 is a perspective view from one side and below.

A rotary member (1) has a pin (2) by which it is pivotally mounted on a blade (13) of a conventional foot pedal. The member (1) has a slot (3) with an arcuate end (4), and a pair of opposed grooves (5) in which are located opposed ribs (6) of a synthetic plastics insert (7) also having an arcuate surface (8) to define a circular aperture (9) to receive a portion of a conventional push rod (12) (FIG. 3) of a brake booster or a clutch.

Remote from the pin (2) is a lever arm (10) provided with a pin (11) engageable with a portion of a vehicle designed to crumple in a frontal crash situation of sufficient magnitude, resulting in rotation of the rotary member (1) until sufficient torque results in the insert (7) being forced out of the rotary member (1), so that the push rod is decoupled, and the foot pedal is freed.

What is claimed is:
1. An arrangement for permitting retraction of a vehicle foot pedal, operable on a conventional push rod of a brake booster or a clutch, in a frontal crash of sufficient magnitude, wherein a rotary member is attached to, and mounted on a blade of a foot pedal for free rotation about a pivot, and adapted to be coupled to a push rod, wherein:
(i) said rotary member (1) has a decoupling feature (3-8) that is not activated during normal operation of said foot pedal, and
(ii) displacement means (10, 11) is provided to cause partial rotation of said rotary member (1) upon a frontal impact on the associated vehicle of sufficient magnitude, to stress said decoupling feature (3-8) until a threshold value is reached whereupon said decoupling feature (3-8) is activated causing disintegration of the coupling feature (3-8), thereby disconnecting said push rod (12) from said rotary member (1) and hence from said blade (13) of a foot pedal, to permit free pedal movement wherein said decoupling feature (3-8) is provided by said rotary member (1) incorporating an insert (7) of synthetic plastics material, with said insert (7) defining, in part, a bore (8) to receive a portion of said push rod (12), whereby rotation of said rotary member (1) in a frontal impact of sufficient magnitude to create a torque exceeding a threshold value results in said push rod (12) forcing said insert (7) from said rotary member (1), thereby decoupling said push rod (12) and said pedal blade.

2. An arrangement as claimed in claim 1, wherein said rotary member (1) is metallic.

3. An arrangement as claimed in claim 2, wherein said rotary member (1) is of mild steel.

4. An arrangement as claimed in claim 1, wherein said rotary member (1) is wholly metallic.

* * * * *